US012629986B2

(12) United States Patent (10) Patent No.: US 12,629,986 B2

MacLean et al. (45) Date of Patent: May 19, 2026

(54) VEHICLE AIR EXTRACTOR HAVING MULTILAYERED FLAPS

(71) Applicant: Ford Global Technologies, LLC, Dearborn, MI (US)

(72) Inventors: Eric Jay MacLean, Brighton, MI (US); Scott Christopher Sterbenz, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 18/317,381

(22) Filed: May 15, 2023

(65) Prior Publication Data

US 2024/0383313 A1 Nov. 21, 2024

(51) Int. Cl.
*B60H 1/24* (2006.01)

(52) U.S. Cl.
CPC .................................... *B60H 1/249* (2013.01)

(58) Field of Classification Search
CPC ................................ B60H 1/248; B60H 1/249
USPC ................... 137/512, 512.3, 512.4; 454/165
See application file for complete search history.

(56) References Cited

U.S. PATENT DOCUMENTS

| | | | | |
|---|---|---|---|---|
| 5,167,574 A | | 12/1992 | Keda et al. | |
| 5,355,910 A | * | 10/1994 | Gies ...................... | F16K 15/144 |
| | | | | 454/162 |
| 6,004,202 A | | 12/1999 | McCorkel et al. | |
| 6,837,784 B2 | * | 1/2005 | Omiya ................... | B60H 1/249 |
| | | | | 454/162 |
| 8,955,542 B2 | * | 2/2015 | Kiezulas ............... | F16K 15/031 |
| | | | | 454/162 |
| 10,543,736 B2 | | 1/2020 | Freeman et al. | |
| 2008/0200109 A1 | | 8/2008 | Valencia | |
| 2010/0216384 A1 | | 8/2010 | McCarthy et al. | |
| 2011/0041930 A1 | * | 2/2011 | Kiezulas ............... | F16K 15/031 |
| | | | | 137/527 |
| 2020/0062084 A1 | * | 2/2020 | Porter .................... | B60H 1/249 |
| 2023/0118518 A1 | * | 4/2023 | Daly ...................... | B60H 1/249 |
| | | | | 454/70 |

* cited by examiner

*Primary Examiner* — Ko-Wei Lin

(74) *Attorney, Agent, or Firm* — Vichit Chea; Carlson, Gaskey & Olds, P.C.

(57) ABSTRACT

An air extractor assembly includes a housing, and at least one multilayered flap pivotably secured to the housing, the at least one multilayered flap configured to transition from a sealed position to a pressure-releasing position relative to at least one first aperture of the housing. The at least one multilayered flap can include a first flap layer directly adjacent a second flap layer. The first flap layer can shield the second flap layer from debris.

19 Claims, 5 Drawing Sheets

VEHICLE AIR EXTRACTOR HAVING MULTILAYERED FLAPS

TECHNICAL FIELD

This disclosure relates generally to an air extractor for a vehicle and, more particularly, to an air extractor having multilayered flaps.

BACKGROUND

Vehicles can include an air extractor. Flow can move through an aperture in the air extractor, as required, to release pressure inside a passenger compartment of the vehicle to an area outside the vehicle. Some air extractors, such as the air extractors of many body-on-frame pickups, are located in areas of the vehicle that may be exposed to debris, such as mud and dirt.

SUMMARY

In some aspects, the techniques described herein relate to an air extractor assembly, including: a housing; and at least one multilayered flap pivotably secured to the housing, the at least one multilayered flap configured to transition from a sealed position to a pressure-releasing position relative to at least one first aperture of the housing.

In some aspects, the techniques described herein relate to an air extractor assembly, wherein the at least one multilayered flap in the sealed position permits less flow through the at least one first aperture than the at least one multilayered flap in the pressure-releasing position.

In some aspects, the techniques described herein relate to an air extractor assembly, wherein the at least one multilayered flap is configured to transition from the sealed position to the pressure-releasing position in response to a difference between a first pressure on a first side of the housing and a second pressure on an opposite, second side of the housing.

In some aspects, the techniques described herein relate to an air extractor assembly, wherein the first pressure is a pressure inside a passenger compartment of a vehicle, and the second pressure is a pressure outside the passenger compartment.

In some aspects, the techniques described herein relate to an air extractor assembly, wherein the difference is the first pressure being higher than the second pressure.

In some aspects, the techniques described herein relate to an air extractor assembly, wherein the at least one multilayered flap is pivotably secured to the housing with a plurality of arrow tabs.

In some aspects, the techniques described herein relate to an air extractor assembly, wherein the at least one multilayered flap includes a first flap layer directly adjacent a second flap layer.

In some aspects, the techniques described herein relate to an air extractor assembly, wherein the first flap layer and the second flap layer are the same material.

In some aspects, the techniques described herein relate to an air extractor assembly, wherein the first flap layer and the second flap layer are both rubber.

In some aspects, the techniques described herein relate to an air extractor assembly, wherein the first flap layer and the second flap layer are nominally the same size.

In some aspects, the techniques described herein relate to an air extractor assembly, wherein a thickness of the first flap layer is less than one millimeter, wherein a thickness of the second flap layer is less than one millimeter.

In some aspects, the techniques described herein relate to an air extractor assembly, wherein at least one multilayered flap is pivotably secured to the housing using a plurality of arrow tabs that extend through both the first flap layer and the second flap layer.

In some aspects, the techniques described herein relate to an air extractor assembly, wherein the first flap layer is configured to warp relative to the second flap layer.

In some aspects, the techniques described herein relate to an air extractor assembly, wherein the housing and the at least one multilayered flap are constituents an air extractor of a pickup truck.

In some aspects, the techniques described herein relate to an air extractor assembly, wherein the air extractor opens to a gap between a passenger compartment and a cargo bed of the pickup truck.

In some aspects, the techniques described herein relate to an air extractor shielding method, including: positioning a first flap layer adjacent a second flap layer to provide a multilayered flap of an air extractor, the multilayered flap configured to transition from a sealed position to a pressure-releasing position relative to at least one first aperture of a housing.

In some aspects, the techniques described herein relate to an air extractor shielding method, further including shielding the second flap layer from debris using the first flap layer.

In some aspects, the techniques described herein relate to an air extractor shielding method, further including contacting the second flap layer against the housing when the multilayered flap is in the sealed position.

In some aspects, the techniques described herein relate to an air extractor shielding method, wherein the first flap layer is configured to warp relative to the second flap layer.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary air extractor that includes multilayered flaps. Debris that build-up and dry on the air extractor can contract one of the layers. The other layer is not substantially warped and is able to substantially maintain a seal.

In the past, drying mud and other debris could collect on air extractors of vehicles. As the mud and debris dry, portions of the air extractors could contract and warp with the mud and debris, which could disrupt the ability of the air extractor to effectively seal. Air extractors in pickup trucks are particularly prone to debris buildup due to wherein the air extractor is positioned, and environments that pickup trucks are commonly used in.

Figure 1:
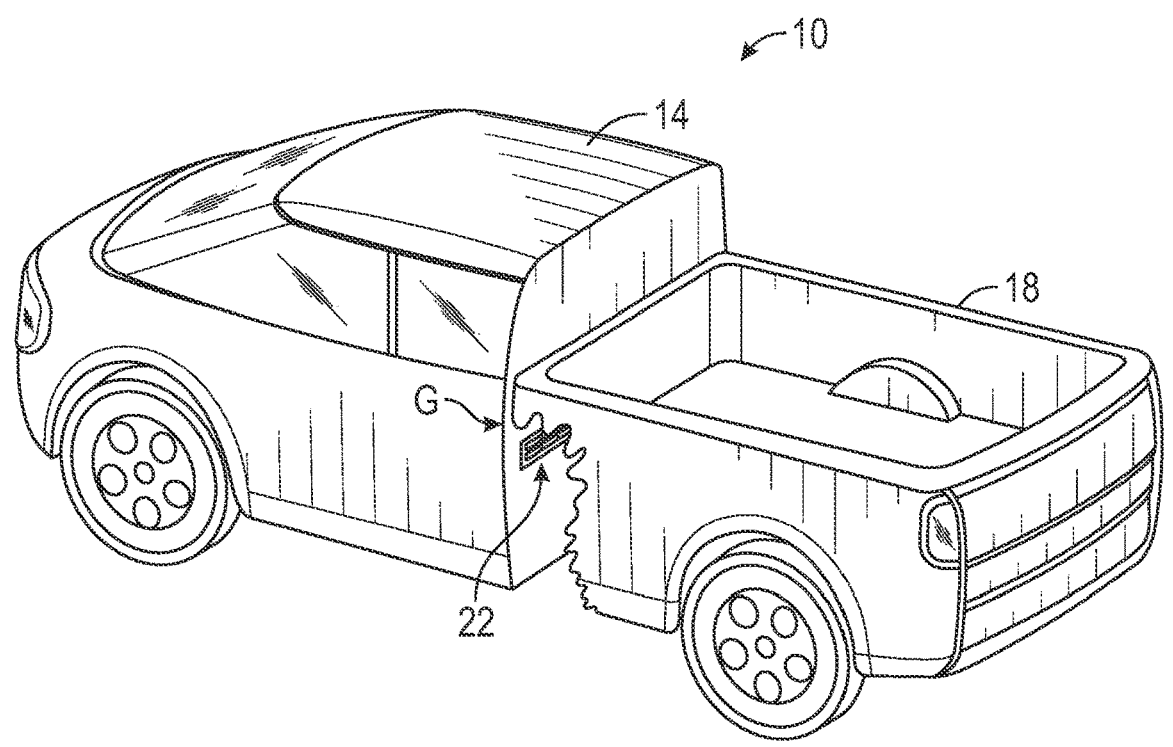
FIG. 1 illustrates a perspective view of a vehicle having an air extractor with multilayered flaps.
Figure 2:
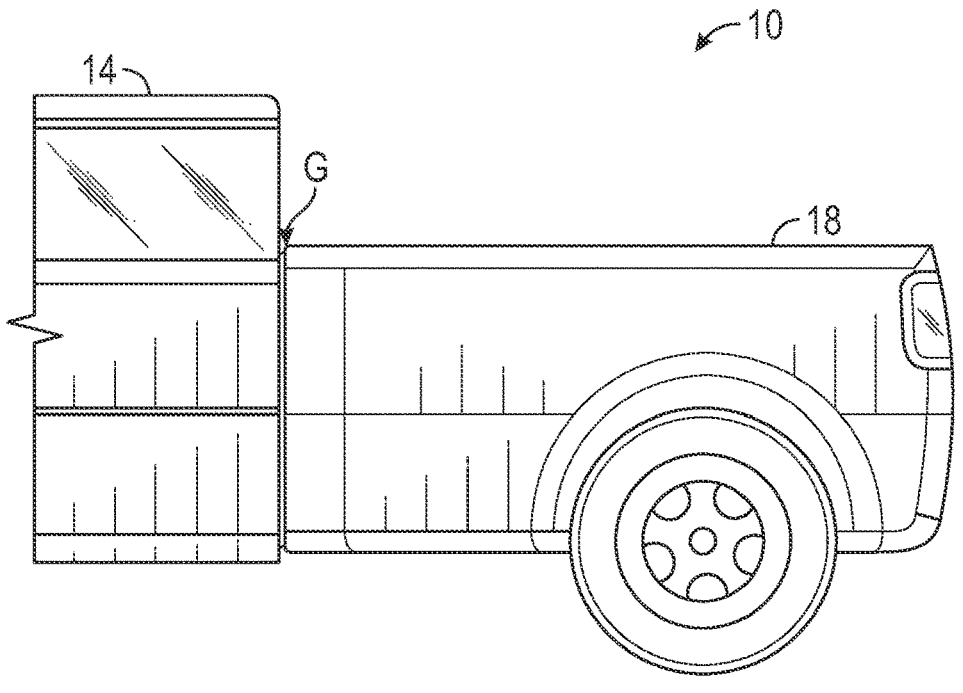
FIG. 2 illustrates a side view of the vehicle of FIG. 1.

With reference to FIGS. 1 and 2, a vehicle 10 includes a passenger compartment 14 and a cargo bed 18. There is a gap G between the passenger compartment 14 and the cargo bed 18. The vehicle 10 is a body-on-frame pickup truck in this example.

Figure 3:
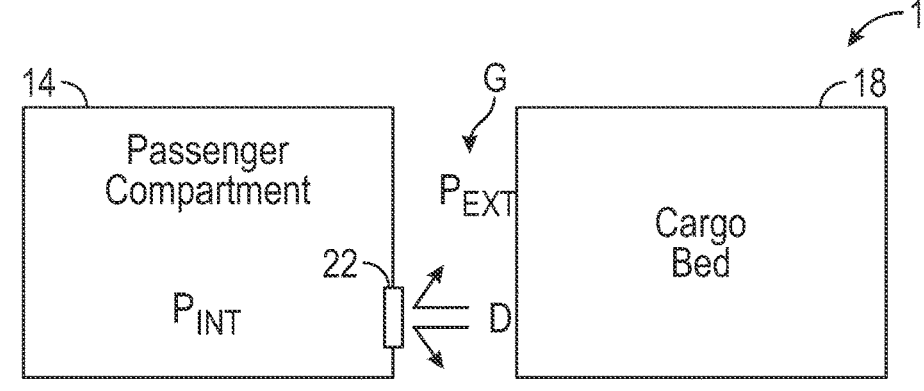
FIG. 3 illustrates a highly schematic view of the air extractor from the vehicle of FIG. 1 in a sealed position.

An air extractor 22 can open to the gap G between the passenger compartment 14 and the cargo bed 18. When in a closed position, the air extractor 22 can block debris D from moving from outside the passenger compartment 14 to the passenger compartment 14 as shown in FIG. 3. The air extractor 22 is generally in a closed position when the pressure $P_{INT}$ inside the passenger compartment 14 is substantially equal to the pressure $P_{EXT}$ outside the passenger compartment. While the example air extractor 22 is shown in connection with the pickup truck, the air extractor could be used with other types of vehicles, such as SUVs and cars if desired.

Figure 4:
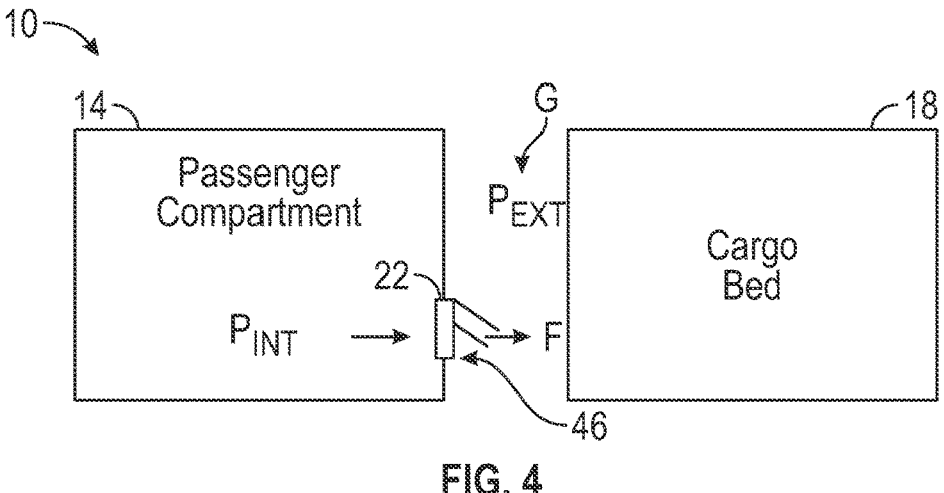
FIG. 4 illustrates the air extractor of FIG. 3 in a pressure-releasing position.
Figure 5:
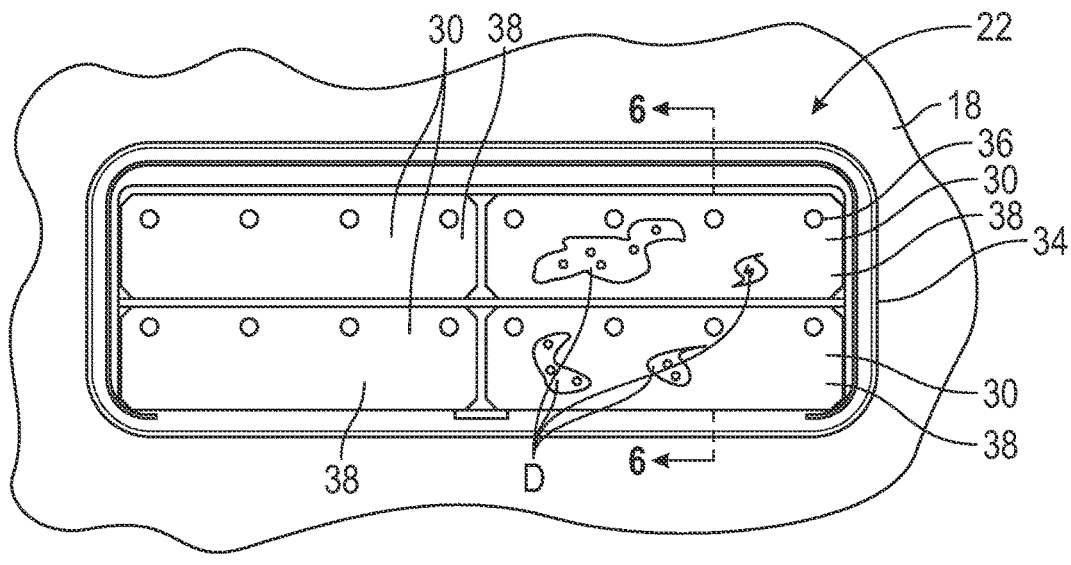
FIG. 5 illustrates a front view of the air extractor from the vehicle of FIG. 1.
Figure 6:
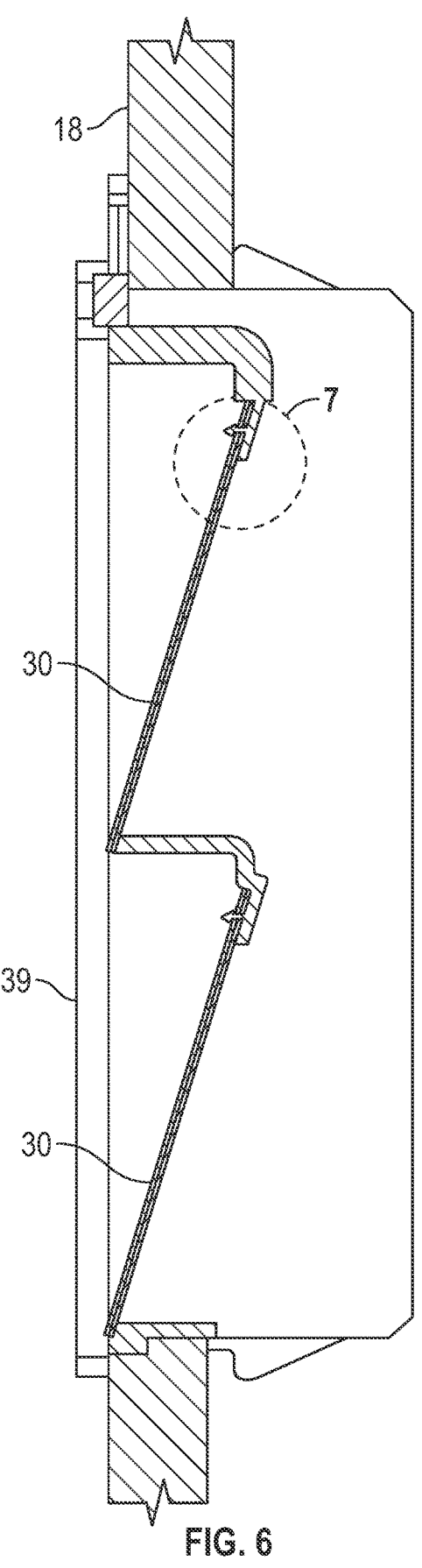
FIG. 6 illustrates a section view taken at line 6-6 in FIG. 5.
Figure 7:
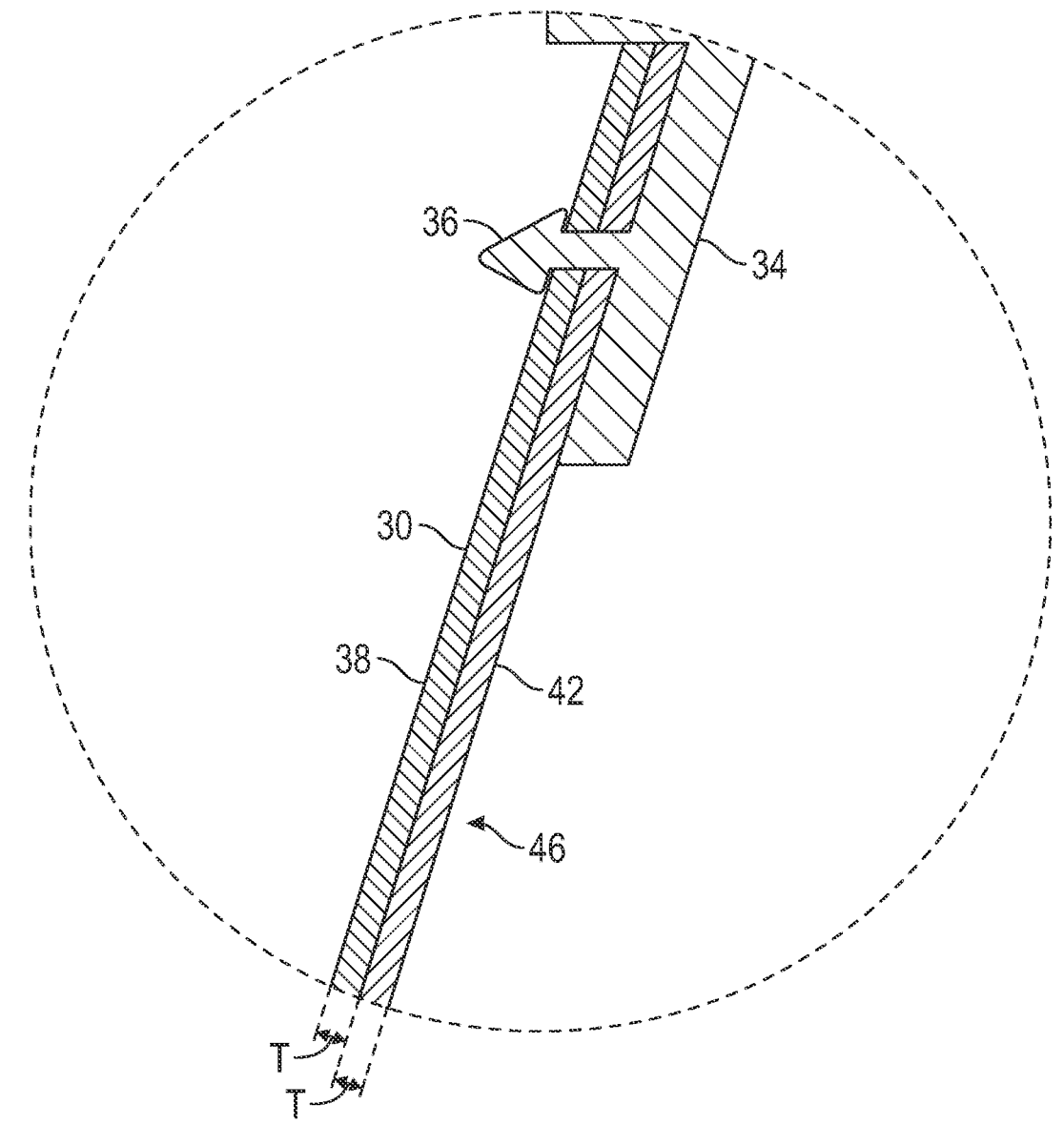
FIG. 7 illustrates a close up view of area 7 in FIG. 6.

In response to a difference between the pressures where the pressure $P_{INT}$ is above the $P_{EXT}$, the air extractor 22 can transition to an open position to permit flow F from the passenger compartment 14 to an area outside the vehicle 10 as shown in FIG. 4. The flow F provides a pressure release for the passenger compartment 14.

The pressure increase within the passenger compartment 14 can be due to, for example, a door of the passenger compartment 14 closing. As the door is closed, the pressure within the passenger compartment 14 can increase, which exerts force against the air extractor 22 and causing the air extractor 22 to open to permit flow F. After the pressures balance between the passenger compartment 14 and the area outside the passenger compartment 14, the air extractor 22 transitions back to the sealed position.

With reference now to FIGS. 5-8, in the exemplary embodiment, the air extractor 22 includes a plurality of multilayered flaps 30 pivotably coupled to a housing 34. In particular, the example air extractor 22 includes four of the multilayered flaps.

The multilayered flaps 30 are pivotably secured to the housing 34 via plurality of arrow tabs 36 of the housing 34. The multilayered flaps 30 can be pressed over the arrow tabs 36 to secure the multilayered flaps 30 relative to the housing 34. The arrow tabs 36 extend through both the first flap layer 38 and the second flap layer 42 in this example.

The multilayered flaps 30 each include a first flap layer 38 and a second flap layer 42. The first flap layers 38 face outward away from the passenger compartment 14. The second flap layers 42 face inward toward the passenger compartment 14 and seal against the housing 24 when the air extractor is in the sealed position.

The first flap layer 38 and the second flap layer 42 are sized the same in this example so that the first flap layer 38 and the second flap layer 42 can be produced utilizing common tooling. However, sizing the first flap layer 38 the same as the second flap layer 42 is not required.

The example first flap layer 38 and the second flap layer 42 both have a thickness T is that is less than one millimeter.

In particular, the thickness T of the example first flap layer 38 and the second flap layer 42 is about 0.5 millimeters.

The first flap layer 38 and the second flap layer 42 are constructed of the same material, but that is not required. The first flap layer 38 and the second flap layer 42 are rubber, in this example.

When the multilayered flaps 30 are in the sealed position, the second flap layers 42 are the areas of the multilayered flaps 30 that directly contacts the housing 34 to seal an aperture 46 within the housing 34. Pressure increases within the passenger compartment 14 cause flow to press against the second flap layers 42 to pivot the multilayered flaps 30 from the sealed position to the pressure-releasing position. The first flap layers 28 and the second flap layers 42 pivot together when the multilayered flaps 30 pivot between the sealed position and the pressure-releasing position.

The first flap layers 38 substantially cover the outwardly facing surface of the second flap layers 42. As the vehicle 10 is driven, debris D can splash onto the air extractor 22. The debris D build up on the first flap layers 38 rather than the second flap layers 42. The first flap layers 38 can shield the second flap layers 42 by blocking the debris from contacting the second flap layers 42.

Figure 8:
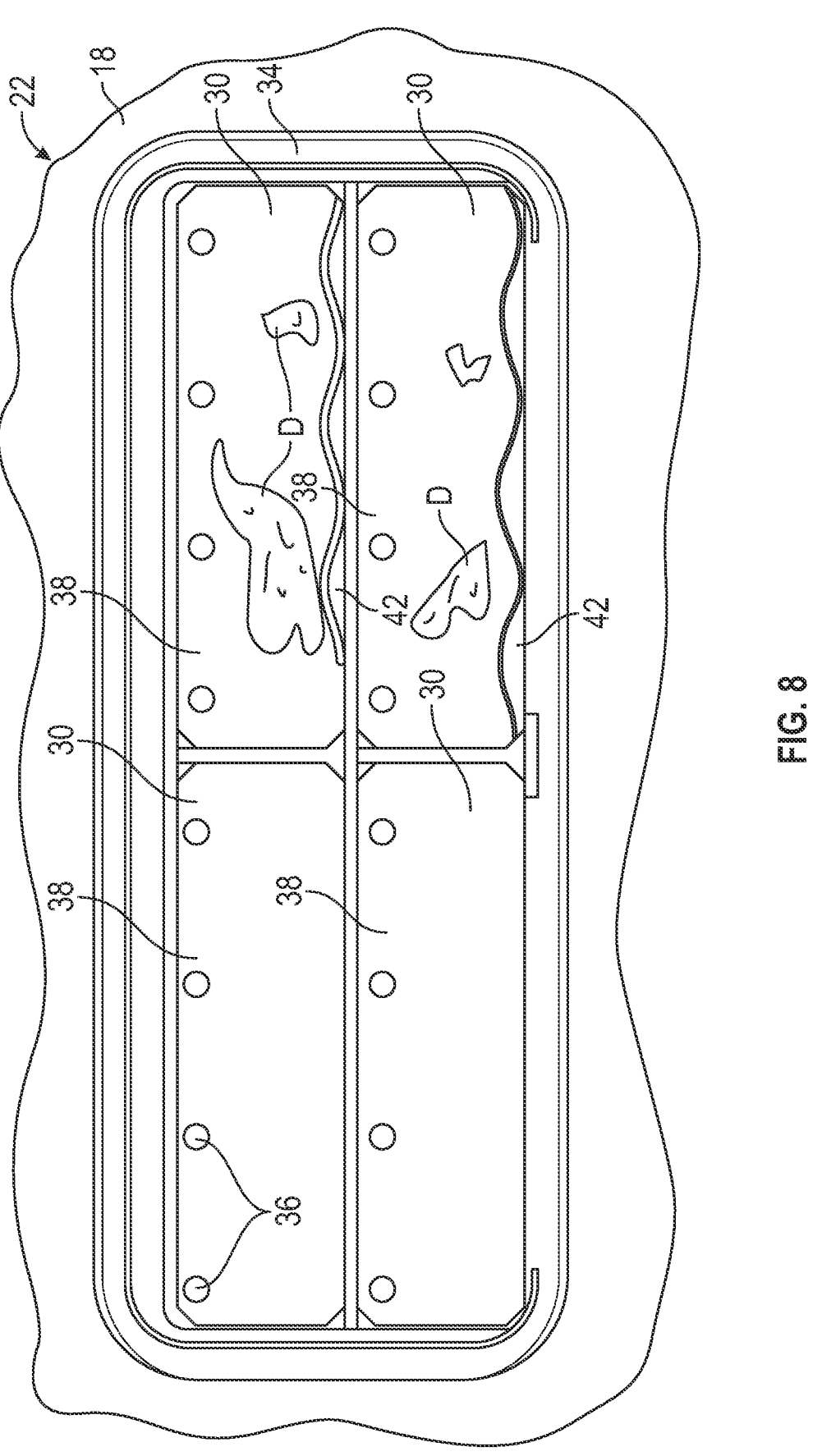
FIG. 8 illustrates the air extractor of FIG. 5 after at least some of the multilayered flaps of the air extractor are warped.

If the debris D contacts and dries and causes warping of the multilayered flaps 30, the warping occurs in the first flap layers 38 as shown in exemplary form in FIG. 8. The first flap layers 38 move relative to the second flap layers 42 when the first flap layers 38 warp. Thus, the dimensions of the second flap layers 42 are maintained, and the second flap layers 42 are able to reliably move to the sealed position against the housing 34.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An air extractor assembly, comprising:
   a housing defining at least one aperture and a plurality of arrow-shaped tabs extending from the housing; and
   at least one multilayered flap pivotably secured to the housing, the at least one multilayered flap configured to transition from a sealed position to a pressure-releasing position relative to the at least one aperture of the housing,
   wherein the at least one multilayered flap comprises a first flap layer directly adjacent a second flap layer, the first flap layer including a plurality of first openings, the second flap layer including a plurality of second openings aligned with the first openings, and
   wherein each arrow-shaped tab includes a stem portion and an enlarged head portion, the stem portion extending through one of the first openings in the plurality of first openings and one of the second openings in the plurality of second openings, and the enlarged head portion configured to mechanically retain the at least one multilayered flap to the housing.

2. The air extractor assembly of claim 1, wherein the at least one multilayered flap in the sealed position permits less flow through the at least one aperture than the at least one multilayered flap in the pressure-releasing position.

3. The air extractor assembly of claim 1, wherein the first flap layer and the second flap layer are the same material.

4. The air extractor assembly of claim 1, wherein the first flap layer and the second flap layer are both rubber.

5. The air extractor assembly of claim 1, wherein the first flap layer and the second flap layer are nominally the same size.

6. The air extractor assembly of claim 1, wherein a thickness of the first flap layer is less than one millimeter, wherein a thickness of the second flap layer is less than one millimeter.

7. The air extractor assembly of claim 1, wherein at least one multilayered flap is pivotably secured to the housing using the plurality of arrow-shaped tabs that extend through both the first flap layer and the second flap layer.

8. The air extractor assembly of claim 1, wherein the first flap layer is configured to warp relative to the second flap layer.

9. The air extractor assembly of claim 1, wherein the housing and the at least one multilayered flap are configured to be constituents of an air extractor of a pickup truck.

10. The air extractor assembly of claim 9, wherein the air extractor opens to a gap between a passenger compartment and a cargo bed of the pickup truck.

11. The air extractor assembly of claim 1, wherein each enlarged head portion defines opposed barbs configured to snap-fit through the respective first and second openings to retain the multilayered flap.

12. The air extractor assembly of claim 1, wherein the enlarged head portion of each arrow-shaped tab is configured to retain the multilayered flap on the stem portion of each arrow-shaped tab.

13. The air extractor assembly of claim 1, wherein the enlarged head portion has a width greater than the respective first opening and greater than the respective second opening.

14. An air extractor shielding method, comprising:

positioning a first flap layer adjacent a second flap layer to provide a multilayered flap of an air extractor, the multilayered flap defining a plurality of first openings in the first flap layer and a plurality of second openings in the second flap layer; and inserting a plurality of arrow-shaped tabs extending from a housing through the plurality of first openings and the plurality of second openings until a stem portion of each arrow-shaped tab extends through the first and second openings and an enlarged head portion of each arrow-shaped tab mechanically retains the multilayered flap to the housing, the multilayered flap configured to transition from a sealed position to a pressure-releasing position relative to at least one first aperture of the housing.

15. The air extractor shielding method of claim 14, further comprising shielding the second flap layer from debris using the first flap layer.

16. The air extractor shielding method of claim 14, further comprising contacting the second flap layer against the housing when the multilayered flap is in the sealed position.

17. The air extractor shielding method of claim 14, wherein the first flap layer is configured to warp relative to the second flap layer.

18. The air extractor shielding method of claim 14, wherein the enlarged head portion has a width greater than the respective first opening and greater than the respective second opening.

19. The air extractor shielding method of claim 14, wherein each enlarged head portion defines opposed barbs configured to snap-fit through the first and second openings to retain the multilayered flap.

* * * * *